United States Patent [19]
Quercetti

[11] Patent Number: 4,474,558
[45] Date of Patent: Oct. 2, 1984

[54] DIDACTIC GAME BASED ON SELECTION OF THE TRAJECTORIES FOLLOWED BY BALLS

[76] Inventor: Alessandro Quercetti, Corso Vigevano 25, I-10152 Torino, Italy

[21] Appl. No.: 480,136

[22] Filed: Mar. 29, 1983

[30] Foreign Application Priority Data

Jul. 27, 1982 [IT] Italy .............................. 67945 A/82

[51] Int. Cl.³ .................... G09B 19/02; A63F 7/02
[52] U.S. Cl. ..................................... 434/189; 235/68; 273/118 R
[58] Field of Search ................. 434/189, 208; 235/68; 273/118 R, 118 D, 120 R, 121 R, 121 D, 122 R

[56] References Cited

U.S. PATENT DOCUMENTS

| | | | |
|---|---|---|---|
| 2,782,037 | 2/1957 | Rovira | 273/122 R |
| 2,875,529 | 3/1959 | Cornelius | 434/208 |
| 3,006,082 | 10/1961 | Libbey | 434/189 X |
| 3,273,794 | 9/1966 | Lieberman et al. | 434/189 X |
| 3,278,187 | 10/1966 | Sinden | 273/118 R |
| 3,388,483 | 6/1968 | Weisbecker | 273/118 R X |
| 3,419,972 | 1/1969 | Kitzinger | 434/208 X |
| 3,747,844 | 7/1973 | Youngman | 235/68 |
| 3,807,736 | 4/1974 | Goldfarb et al. | 273/122 R |
| 3,994,076 | 11/1976 | Bertman | 434/189 |
| 4,006,344 | 2/1977 | Schutte | 434/189 X |

Primary Examiner—William H. Grieb
Attorney, Agent, or Firm—Young & Thompson

[57] ABSTRACT

A didactic game wherein a number of balls are allowed to roll by gravity along a guide channel on a play plate. The guide channel has bifurcations controlled by switch means provided with manual control members for selecting the trajectory of each ball and direct the same towards a specific nest of a plurality of nests arranged at the outlet of the ramifications of the guide channel. All switch means of the same order are connected to a single collective control member. The two positions of each control means are designed by the digits 0 and 1, which, read from the top towards the bottom, indicate in binary numeration the progressive number of the nest made reachable by the ball. This progressive number is marked in decimal numeration in the nests. The game may be used, in addition to play purposes, also for explicating and fix in the memory the practice of translating numbers from one to the other system of numeration.

17 Claims, 4 Drawing Figures

DIDACTIC GAME BASED ON SELECTION OF THE TRAJECTORIES FOLLOWED BY BALLS

BACKGROUND OF THE INVENTION

This invention relates to a game of the type comprising a play plate on which little balls may roll by gravity, and guide members disposed on said play plate, wherein a part of said guide members can be controlled to define and modify the trajectory each time followed by the balls.

Generally, these types of games have the character of billiard-like or flipper-like games, and therein the trajectory followed by each ball is subjected to partly voluntary and partly casual influences which confere to the game a character of cleverness but restrict its application just to the gaming field, excluding any didactic effect therefrom.

BRIEF SUMMARY OF THE INVENTION

The object of the invention is to provide a game of the general type mentioned hereinabove, in which the player will have the full control of the trajectory followed by each ball, the cleverness of the player being directed to make the ball reach a determined point, and this in such conditions as to allow the development of the game to be related to elements of knowledge, such as those relating to the numeration in various bases, so that the game will also be suitable for didactic applications.

This object is attained, according to the invention, by a game of the type specified hereinabove, comprising an upper magazine of balls, a delivery shutter with a control member actuable to allow the delivery of only one ball at a time from the ball magazine, a guide channel for the balls which begins in register with said delivery shutter and is provided with successive ramifications each giving rise to at least two branches, a plurality of nests which may be reached by each ball through one way defined by said ramifications and branches of the guide channel, a multiple shutter arranged to normally retain within said nests the balls arriving therein and provided with a control for allowing the balls to leave said nests, and a number of switch means disposed at each said ramifications of the guide channel and provided with control members operable to select the branch which each time is made accessible to a ball travelling through the guide channel.

Thanks to this arrangement the player is in a position to exactly anticipate, depending on the position of the control members of the switch means, which nest will be reached by the ball travelling through the guide channel, but such forecast presupposes a logical reasoning about the successive effects of the various switch means on the rolling ball, and thus requires a certain cleverness and gives rise to a formative activity, both in case of the game being developed with the view of a simple amusement, and in case it has a didactic purpose involved therein.

Preferably, the ramifications of said guide channel are bifurcations, and said switch means have each two operative positions corresponding to the accessibility of one or the other branch of the guide channel downstream the switch means considered. Moreover, the first bifurcation of the guide channel is controlled by a sole switch means connected to a first control member, the bifurcations of each successive order of the various branches of the guide channel are controlled by switch means collectively connected to a control member of the same order, and the various control members are disposed to form an orderly series. Thanks to these arrangements, the logic which regulates the control of the switch means is that of the binary numeration and the prevision of the nest reachable by the ball can be made by reasoning in terms of binary numeration. This constitutes an effective means for learning and practising the use of this system of numeration.

Structurally, said switch means may be formed by prisms with triangular base arranged to occlude each time a branch of a bifurcation, at the same time acting as entrance guide for the other branch, all the switch means of the bifurcations of the same order being supported by a common list slidably housed in a longitudinal hollow guide formed in the play plate, and having at one end a projection forming the control member. Each said list may be provided with two recesses cooperating with a springing member to define the two operative positions of the switch means supported by the list. These characteristics allow a simple and economical construction of the mechanisms for the control of the switch means.

Said shutters, in their turn, may be formed by vanes normally arranged to intercept the trajectory of the balls and movable to a neutralized position, the vanes of each shutter being supported by a common list slidably housed in a longitudinal hollow guide formed in the play plate, having at one end a projection forming the control member, and cooperating with a springing member which biases it towards the normal position of interception of the vanes. These characteristics allow a simple and economical construction of the mechanisms for the control of the shutters.

Preferably, the delivery shutter situated at the outlet of the ball magazine has two mutually offset vanes for limiting the passage to a single ball every actuation, and it also supports a pin movable within the magazine of the balls. This characteristic ensures a periodical displacement of the balls within the magazine, which prevents possible cloggings.

It is advantageous that said play plate comprises a sheet disposed over said lists which support the switch means and the shutting vanes. In this way, the mechanism may be partially concealed and the play plate may be decorated or marked in the desired manner by suitably printing said sheet.

The play plate may form, beneath said multiple shutter of the nests, a return channel extending periferally of the play plate and opening into the upper ball magazine. In this way, after each play phase, the balls discharged from the nests can be caused to return to the upper magazine by suitably tilting the play plate.

Said play plate is covered by a transparent cover capable of retaining the balls on the play plate, yet allowing the vision of said balls. Preferably, the guide channel for the play plate is constructionally formed on said transparent cover. In this way, even complicated configurations of the guide channel can be obtained without constructional difficulties.

Advantageously, said guide channel is provided at its bifurcations with marks corresponding to similar marks which identify the positions of the control members of the corresponding switch means. Preferably, said marks are distinct colorations of the branches which depart from each bifurcation of the guide channel, and correspondingly colored zones are left uncovered by the control members. This facilitates making a visual correlation between the positions of the control members and the consequences of the switches on the trajectory of the balls.

Advantageously, the two positions of the control members of the switch means are further marked by the digits 0 and 1, disposed in such a manner that the digits relating to the positions of the control members, read from the top towards the bottom, indicate in the form of binary numeration the progressive member of the nest made reachable by the ball. Furthermore said nests, in their turn, are marked by a progressive number expressed in the form of decimal numeration. These arrangements concretely express the correspondence between numbers expressed in the form of decimal numeration and respectively in the form of binary numeration, thereby facilitating learning the practice of translating numbers from one to the other system of numeration.

Preferably, said transparent cover superimposed to the play plate has position reference means, and an accessory non transparent covering member is provided for being applied on said position reference means, thus concealing the guide channel of the play plate and its ramifications and branches. By using this accessory, the visual control of the relation between the position of the control means and the nest made accessible for the ball becomes impossible, which renders it necessary to make the prevision of this relation by reasoning and to verify then its exactness. This proceeding is suitable for a more advanced play or learning phase.

Advantageously, the play plate is provided, on its lower surface, with hooking means for supporting said covering member when it is not in use. This avoids the possible loss of the accessory or the difficulties encountered in finding the same at the moment of its use.

DETAILED DESCRIPTION OF A PREFERRED EMBODIMENT

These and other characteristics and advantages of the invention will be more clearly apparent from the following description of an illustrative and non limiting embodiment, diagrammatically shown in the annexed drawings, in which.

Figure 1:
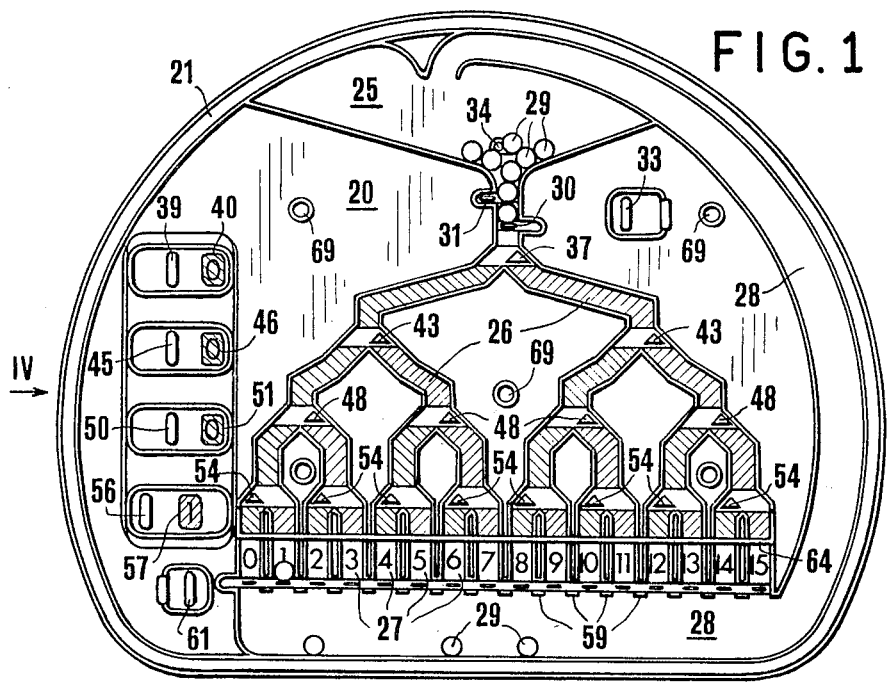
FIG. 1 is a front view, on reduced scale, of the game without the covering member.
Figure 2:
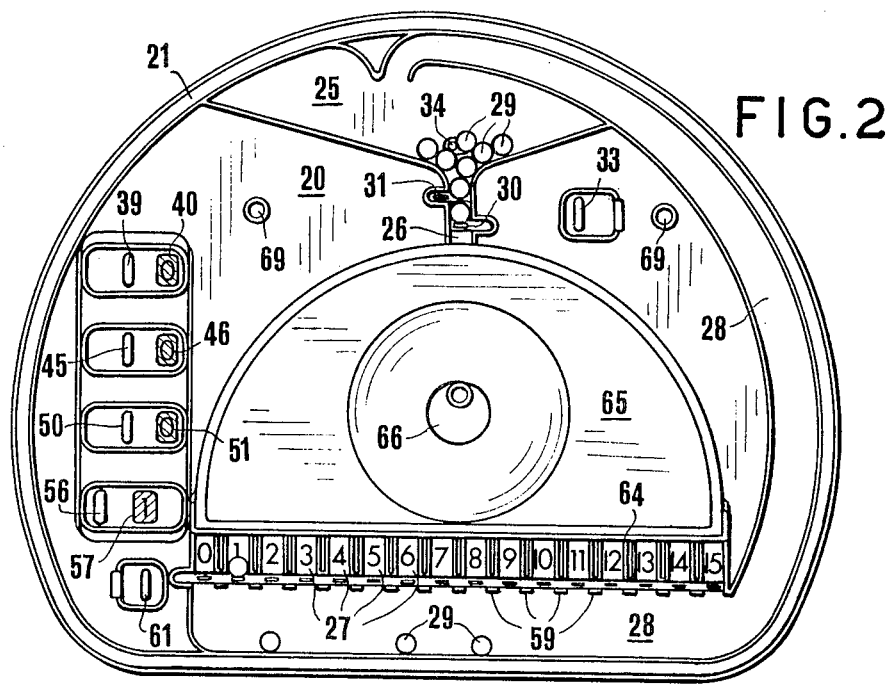
FIG. 2 is a similar view of the game with the covering member applied thereon.

The game comprises a play plate 20, in this case in the form of a circular segment, provided with a peripheral rim 21 and with feet 22 for supporting it on the plane 23 of a table or the like, in an inclined position such as to ensure the balls to roll by gravity on the play plate 20. Disposed over the play plate 20 is a transparent cover 24 which, on its surface turned towards the play plate 20, is provided with projections defining the various spaces reserved for the balls, namely: an upper ball magazine 25, a many times bifurcated guide channel 26, a series of nests 27 at the end of the branches of the guide channel 16, and a return channel 28 which begins beneath the nests 27 and opens into the upper ball magazine 25. In FIGS. 1 and 2 some balls 29 are shown in the ball magazine 25, in a nest 27 and in the return channel 28. It is understood that in practive the number of balls included in the game will generally be higher.

Figure 3:
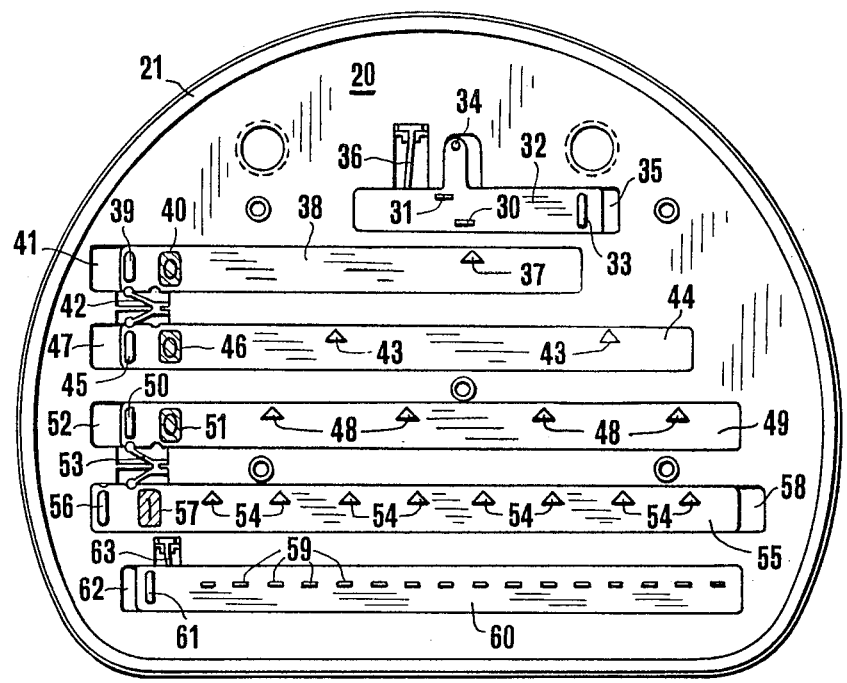
FIG. 3 is a view of the play plate with the control mechanisms, after removal of the transparent cover and the concealing sheet.
Figure 4:
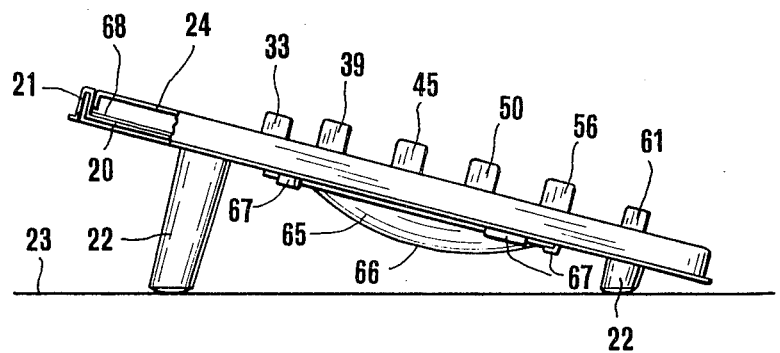
FIG. 4 is a side view of the game in the direction of the arrow IV of FIG. 1.

At the outlet of the ball magazine 25 there is disposed a delivery shutter formed by two mutually offset vanes 30 and 31, mounted on a list 32 slidably housed in a guide 35 formed in the plate 20, and having a control projection 33 traversing the transparent cover 24 through a corresponding window. A springing member 36 biases the list 32 towards the shutting position shown in the drawing; by acting onto the control projection 33, the list 32 with the vanes 30 and 31 may be temporarily displaced and thereafter it spontaneously returns to its shutting position. During this process, the vanes 30 and 31 allow the outlet from the ball magazine 25 of one single ball 29. List 32 has also a pin 34 which projects into the ball magazine 25 and at every action on the control member 33 displaces the balls 29, thereby preventing them from becoming clogged. When the game is in the conditions of use, the described mechanism is concealed by a sheet 68 which is a part of the play plate and on which the balls 29 roll; this sheet has been removed in FIG. 3 in order to show the mechanisms.

The guide channel 26 begins downstream the delivery shutter described hereinabove, and it shows immediately a first bifurcation into which there is inserted the first switch means 37, formed by a prism of triangular cross-section mounted on a list 38 slidably housed in a guide 41 of the play plate 20 and provided with a control projection 39 and a window 40, as well as with two small recesses cooperating with a springing member 42 to define the two operative positions of the list 38.

In the position shown, shifted to the right, the switch means 37 intercepts the righthand branch (as viewed in FIG. 1) of the channel 26 and guides the balls towards the lefthand branch; thses two branches are colored in a different manner (shown by a different hatching in the drawing) and the window 40 uncovers an underlying zone colored correspondingly to the accessible branch and further bearing, in this case, the digit 0. By shifting to the left the control member 39, the righthand branch of the guide channel 26 would be rendered accessible and through the window 40 a zone having a corresponding color and bearing the digit 1 would be uncovered.

Each of the thus bifurcated branches of the channel 26 proceeds to a second order bifurcation having a switch means 43. The two switch means 43 in the form of triangular prisms are supported by a common list 44 which is slidably housed in a guide 47 recessed in the play plate 20 and is provided with a control projection 45, a window 46 and recesses cooperating with the springing member 42 to establish the two operative positions of the list 44. The behaviour of these parts is completely similar to that of the corresponding parts of the first bifurcation.

As in the foregoing, the branches of the guide channel 26 which depart from the second order bifurcations proceed towards third order bifurcations provided with switch means 48 mounted on a list 49 which is slidably housed in a guide 52 and is provided with a control projection 50 and a window 51. The operative positions of the list 49 are determined by recesses cooperating with a springing member 53. Finally, the branches of the guide channel 26 which depart from the third order bifurcations proceed to fourth order bifurcations provided with switch means 54 mounted on a list 55, slidably housed in a guide 58 and provided with a control projection 56, a window 57 and recesses cooperating with the springing member 53. In the embodiment shown there are thus provided four order of bifurcations of the guide channel 26, but it is clear that a different number of orders of bifurcations could be used.

The branches of the guide channel 26 which depart from the fourth order bifurcations lead to the nests 27, beneath which there is situated a multiple shutter comprising a plurality of vanes 59 mounted on a common list 60 which is slidably housed in a guide 62 formed in the play plate 20 and is provided with a control projection 61; the list 60 is retained in the shutting position by a springing member 63, and when it is shifted by operating the control member 61 it allows all the balls 29 located in the nests 27 to descend towards the return channel 28. The nests 27 are numerated sequentially according to the decimal numeration, i.e., in this case, from 0 to 15.

As it can be appreciated, with the arrangements described hereinabove, if one composes a binary number readable in vertical direction through the windows 40, 46, 51 and 57, and then operates the shutter 30 in order to let a ball 29 fall down from the ball magazine 25, this ball, guided by the various switch means 37, 43, 48 and 54 in the successive bifurcations of the guide channel 26, runs into the nest 27 marked, in decimal numeration, by the same number which has been composed in binary numeration. Thus, in the configuration shown by the drawing, by setting up the binary number 0001, the nest No. 1 has been made accessible. By setting up, for example, the binary number 1010, in the descent of the ball a deviation to the right would take place at the first bifurcation, a deviation to the left at the second bifurcation, a deviation to the right at the third bifurcation and a deviation to the left at the fourth bifurcation, thus reaching the nest No. 10. During this process, the observation of the sucessive deviations of the ball assists the observer in materializing and memorising the mechanism of the binary numeration and that of the conversion of the numbers from one to the other numeration system.

The transparent cover 24 bears a reference projection 64 onto which may be made to rest an acessory non transparent covering member 65 provided with a central bore 66 for facilitating the grasping thereof. The covering member 65, which in this case is almost semicircular, is made in such a manner as to cover all the space interested by the guide channel 26 with its branches, bifurcations and switch means. There remain visible, besides the control members 39, 45, 50 and 56 and the respective windows 40, 46, 51 and 57, only the nests 27. In this configuration, shown in FIG. 2, the mechanism of deviation of the balls is concealed and the prevision of the accessible nest is only possible by theoretical reasoning based on the positions of the control members. Thus, this configuration is suitable for a more advanced stage of learning.

The covering member 65, when not in use, can be hooked on projections 67 provided on the lower face of the play plate 20.

It is clear that the constructional details of the parts described hereinabove may be in many ways modified; thus, the shape of the play plate, the number of the bifurcations, the arrangement of the control members, the means for marking the branches and the corresponding notations of the control members, may be chosen with great freedom of choice. The described construction, which ensures great simplicity of realization, and in which the various components are simply superimposed and can be assembled, for example, by means of elastic snap plugs 69, is in no way limiting, and many other constructional systems may be employed. The switch means could be formed by oscillating needles. In the cases in which it is desired to render more complicated the game, by renouncing to its didactic character, ramifications with more than two branches may be provided. Finally, for certain applications, the covering member could also be formed by a fixed member.

I claim:

1. A game including an inclined play plate, on top of said play plate a ball magazine, in said ball magazine a number of little balls suitable for rolling on said play plate, said ball magazine having an outlet, at said outlet a delivery shutter having a control member actuable to allow the delivery of only one ball at a time from the ball magazine, a guide channel for the rolling balls departing from said delivery shutter and having a number of successive ramifications, at least two branches of guide channel departing from each ramification, a nest at the end of each branch of the guide channel, at said nests a multiple shutter normally retaining within said nests the balls arriving therein and having a control member for displacing the multiple shutter and removing the balls from the said nests, and a pluraltiy of switch means each disposed in one of said ramifications of the guide channel and having control members operable to displace said switch means and select the branch which each time is made accessible to a ball travelling through the guide channel.

2. A game as claimed in claim 1, wherein said ramifications of said guide channel are bifurcations, and said switch means have each two operative positions corresponding to the accessibility of either one of the branches of the guide channel downstream the switch means considered.

3. A game as claimed in claim 2, wherein the switch means controlling the first bifurcation of the guide channel is siingularly connected to a first of said control members, the switch means controlling the bifurcations of each successive order of the various branches of the guide channel are collectively connected to one of said control members, and all said control members are orderly disposed in a series.

4. A game as claimed in claim 3, wherein said switch means comprise guide cavities recessed into said play plate, list members slidably housed into said cavities and having each at one end a projection forming a control member, and a number of triangular prisms arranged one in each bifurcation to occlude each time a branch of the bifurcation, at the same time acting as entrance guide for the other branch, all the triangular prisms of the bifurcations of the same order being connected to the same list member.

5. A game as claimed in claim 4, wherein each said list member has two recesses, and a springing member cooperating with said recesses of the list member is provided to define the two operative positions of the switch means supported by the list member.

6. A game as claimed in claim 1, wherein said shutters comprise guide cavities recessed into said play plate, list members slidably housed into said cavities and having each at one end a projection forming a control member, and a number of vanes normally arranged to intercept the trajectory of the balls and movable to a neutralized position, the vanes of each shutter being connected to the same list member, and springing members each cooperating with one of said list members for biasing said list member towards the normal position of interception of the vanes.

7. A game as claimed in claim 6, wherein the vanes of the delivery shutter situated at the outlet of the ball magazine are two and are mutally offset for limiting the passage to a single ball every actuation, said delivery shutter further having a pin movable within the magazine of the balls.

8. A game as claimed in claim 6, wherein said play plate comprises a sheet disposed over said lists members supporting the switch means and the shutting vanes.

9. A game as claimed in claim 1, further comprising a return channel commencing beneath said multiple shutter of the nests, extending peripherally to the play plate and opening into the upper ball magazine.

10. A game as claimed in claim 1, further comprising a transparent cover superimposed to said play plate for retaining the balls on the play plate yet allowing the vision thereof.

11. A game as claimed in claim 10, wherein said guide channel for the play plate is constructionally a part of said transparent cover.

12. A game as claimed in claim 1, wherein said guide channel is marked at its bifurcations by means of marks corresponding to similar marks identifying the positions of the control members of the corresponding switch means.

13. A game as claimed in claim 12, wherein sad marks are formed by distinct colorations of branches which depart from each bifurcation of said guide channel and by correspondingly colored zones left uncovered by said control members.

14. A game as claimed in claim 2, wherein the two positions of each control member of the switch means are marked by the digits 0 and 1 disposed in such a manner that the digits relating to the positions of the control members, read from the top towards the bottom, indicate in the form of a binary number the progressive number of the nest rendered reachable by the ball.

15. A game as claimed in claim 14, wherein said nests are marked by a progressive number expressed in the form of a decimal number.

16. A game as claimed in claim 10, wherein said transparent cover superimposed to the play plate has position reference means, and a non transparent covering member is provided which, when applied onto said position reference means, conceals the guide channel of the play plate and its branches and bifurcations.

17. A game as claimed in claim 16, wherein said play plate has, at its lower surface, hooking means for supporting said covering member when not in use.

* * * * *